United States Patent [19]

Economy et al.

[11] Patent Number: 5,399,377
[45] Date of Patent: Mar. 21, 1995

[54] BORAZINE OLIGOMERS AND COMPOSITE MATERIALS INCLUDING BORON NITRIDE AND METHODS OF MAKING THE SAME

[75] Inventors: James Economy; Dong-pyo Kim, both of Urbana, Ill.

[73] Assignee: The Board of Trustees of the University of Illinois, Urbana, Ill.

[21] Appl. No.: 999,334

[22] Filed: Dec. 31, 1992

[51] Int. Cl.$^6$ ............................................. B05D 3/02
[52] U.S. Cl. .................................... 427/226; 427/356; 427/370; 427/274.7; 427/443.2; 423/285; 423/290; 528/7
[58] Field of Search ............ 427/226, 356, 370, 372.7, 427/443.2; 423/285, 290; 528/7

[56] References Cited

U.S. PATENT DOCUMENTS 3,620,780  11/1971  Economy et al. .................... 106/55
4,970,095  11/1990  Bolt et al. ............................ 427/226

OTHER PUBLICATIONS

Fazen et al. "Thermally Induced Borazine Dehydropolymerization Reactions . . . " *Chemistry of Materials*, vol. 2, No. 2, Mar./Apr. 1990.

Economy, J., et al., "A One-Step Process for Fabrication of Carbon–Carbon Composites," *Carbon*, vol. 30, No. 1, pp. 81–85 (1992).

Jung, H., et al., "Design of Oxidation-resistant Coatings for High-temperature Composites," *Polymers for Advanced Technologies*, vol. 2, pp. 265–268 (1991).

Lin, R., et al., "Preparation Of BN/BN Composites," *Ceramic Bulletin*, vol. 55, No. 9, pp. 781–784 (1976).

*Primary Examiner*—George F. Lesmes
*Assistant Examiner*—C. Raimund
*Attorney, Agent, or Firm*—Dressler, Goldsmith, Shore & Milnamow, Ltd.

[57] ABSTRACT

Borazine oligomers in liquid form are produced and used to create composites of fibers bonded to boron nitride as a matrix and also to coat or increase the density of various fiber composites.

8 Claims, 3 Drawing Sheets

BENZENE

BORAZINE

N=4

N=11

N=5

N=13

N=7

BORAZINE OLIGOMERS AND COMPOSITE MATERIALS INCLUDING BORON NITRIDE AND METHODS OF MAKING THE SAME

This invention was made with government support with Contract No. N00014-90-J-4108 awarded by the Department of the Navy. The government has certain rights in the invention.

SUMMARY OF THE INVENTION

The present invention relates to the production of borazine oligomers and improved composite materials including boron nitride.

BACKGROUND OF THE INVENTION

Materials which do not deteriorate mechanically and continue to function in extremely high temperatures, say from 300° C. to as high as 2500° C., or even higher, are desirable and necessary in a wide range of modern applications.

Examples of such applications include those in the aerospace industry where numerous structures have such requirements, including rocket and space shuttle nose cones, re-entry heat shields, rocket and jet engine nozzles, and leading edges of aircraft and spacecraft. Brake systems, particularly for high speed vehicles, and turbine components also encounter such conditions. The uses for such materials are expected to increase in the future. Indeed, each advance in material science increases the possible applications for materials which are stable at increasingly high temperatures.

Ceramics have replaced metals in some such applications, the most popularly known of which is the ceramic tiles used as a re-entry heat shield for the space shuttle. However, it is well-known that these tiles suffer severe injury during each re-entry and many must be replaced after each expedition.

One class of materials useful in such applications has been composites of carbon fibers reinforcing a carbon matrix. These may conveniently be referred to as CFCM composites. Co-inventor J. Economy, with H. Jung and T. Gogeva, authored a paper describing processes for preparing CFCM composites in Carbon, Vol. 30, No. 1, pp 81-85 (1991).

CFCM composites are considerably stronger and lighter than graphite. They actually increase in strength with increasing temperature and resist thermal shock caused by rapid ambient temperature changes. However, fabrication is a slow expensive process. The carbon matrix is usually introduced among the carbon fibers by liquid impregnation and charring of organic materials. In some applications, chemical vapor deposition is used as a final step in processing. The steps in the processes are repetitive and can take months to complete.

Coatings are often required to protect the carbon containing composite from oxidation at high temperatures. See, for example, the article on such coatings by H. Jung and J. Economy in Polymers for Advanced Technology, Vol. 2, pp 265-269 (1991). Coatings may be less effective than desired due to the development of pinholes or microcracks in the coatings or diffusion of oxygen through the coating.

Another composite was described by R. Lin, J. Economy and H. Batha in Ceramic Bulletin, Vol. 55, No. 9, pp 781-784 (1976). This composite consisted of a boron nitride matrix reinforced with boron nitride fiber. Boron nitride fibers are described in U.S. Pat. No. 3,620,780 to J. Economy and R. Andersen. Boron nitride would appear to have advantages for structures in a high temperature environment due to its high thermal resistance and other properties. In the cited study, boron nitride fibers were mixed with partially nitrided boron nitride fibers and the mixture was hot pressed from room temperature to 1400° C. and then to 2000° C. The resulting composites were extremely brittle which may explain why such composites have not been the subject of any subsequent research known to applicants.

In a paper published in Chemistry of Materials 1990, 2, pp 96-97, P. J. Fazen, et al. reported the production of a boron nitride composition from borazine. Both the method and the resulting composition are different from those of the present invention. The boron nitride produced by the process typically had an interlayer spacing of 3.55 Angstroms to 3.59 Angstroms. However, for boron nitride to have acceptable resistance to deterioration caused by moisture the interlayer spacing must be much lower, in the range of 3.35 Angstroms to 3.40 Angstroms.

The present invention overcomes many of the problems of the prior art which are discussed above. By providing an oligomeric precursor of boron nitride with appropriate viscosity, a boron nitride precursor is produced which can wet and impregnate a variety of fiber layups used in structural composites. Preparation time for such composites is shortened from months to days with concomitant cost savings. Composite characteristics may be easily adjusted for particular applications.

DETAILED DESCRIPTION

Figure 1:
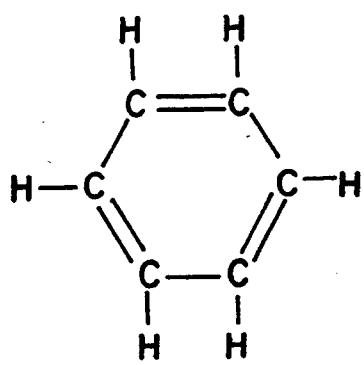
FIG. 1 shows structural diagrams of benzene and borazine monomer rings.
Figure 1:
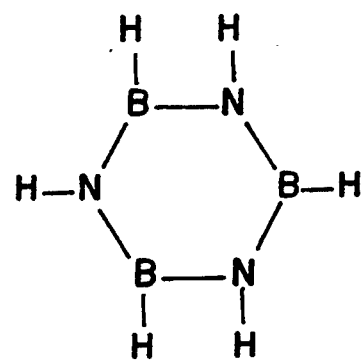

Borazine or borazole is a colorless volatile liquid compound, usually formed by heating diborane ($B_2H_6$) and ammonia ($NH_3$) at a temperature of 250°-300° C., the reaction being represented by $3B_2H_6 + 6NH_3 = 2B_3N_3H_6$. Borazine is similar to benzene ($C_6H_6$) in its reactions and properties because both compounds have a hexagonal ring structure, as illustrated in FIG. 1. They contain the same number of atoms and the same number of valence electrons; that is, one boron atom with three electrons and one nitrogen atom with five electrons are equivalent to two carbon atoms with four electrons each. As with benzene, the hydrogen atoms in the ring may be replaced by other atoms. Borazine is available commercially in developmental quantities.

It should be apparent to one skilled in the art, however, that the starting materials for this invention could be those used to produce borazine monomer, which might also result in additional production of oligomers.

Importantly for the present invention, multiple ring compounds may be produced by borazine reacting with itself when subjected to heat treatment at about 70° C.

Such multiple ring compounds are generally referred to as "polymers" (from the root "poly" meaning "many"). Compounds with small numbers of units are sometimes referred to as "oligomers" (from the root "olig" meaning "few"). In the description of this invention and in the claims, the term "oligomers" is defined as meaning compounds having an average by number of ring units less than 18. Typically, we would prefer oligomers with number average molecular weights of 300 to 1000, having 7 to 12 ring units.

Important aspects of the invention are a composition of matter which is an oligomer of borazine and a method of producing such a composition. The term "oligomer" is used in the previously defined sense.

Figure 2:
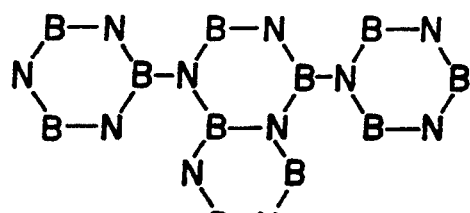
FIG. 2 shows structural diagrams of five exemplary borazine oligomers with ring structures numbering from four to thirteen.
Figure 2:
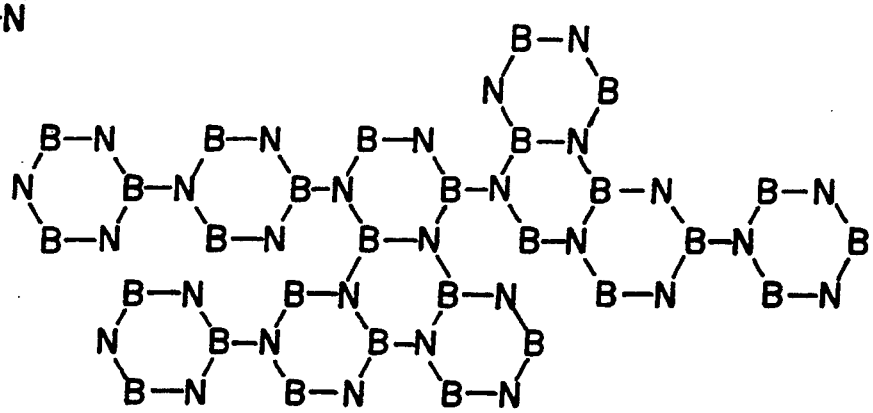
Figure 2:
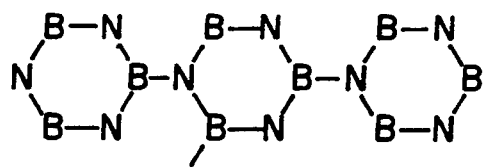
Figure 2:
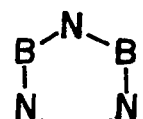
Figure 2:
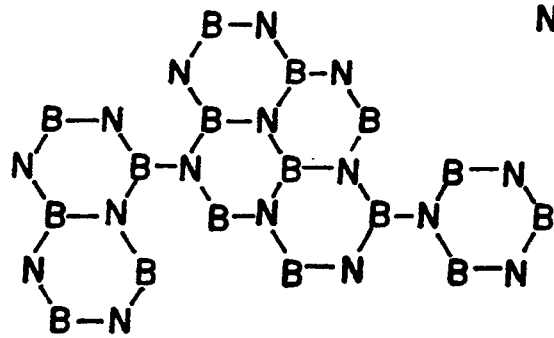

Borazine oligomers, examples of which are shown in FIG. 2, are prepared by heating a sample of borazine at 70° C. or more in a nitrogen atmosphere. The sample gradually becomes more viscous and condensed with the formation of linked borazine rings. For use in the process of preparing the composites described below, viscosity of between approximately 100 centipoise and 10,000 centipoise appears to be most advantageous, with the optimum apparently being around 1000 centipoise.

In a more important aspect of the invention, composite materials using borazine oligomers have been produced using the oligomers as a matrix for fiber layups. A variety of high temperature fibers could be used such as those of carbon compounds, BN, SiC, $Si_3N_4$, $Al_2O_3$, $ZrO_2$, $SiO_2$ or various mixtures. The fibers, however, must not be such as to melt or change properties during the high temperature processing described below.

Generally, the process involves placing the fibers in a mold, adding liquid borazine oligomer and thereby impregnating the fibers with the oligomer and applying heat and pressure to the fibers and liquid in the mold to produce a solid composite material. The density of the composite materials may be further increased by immersing them in liquid borazine oligomer whereby the oligomer infiltrates between the fibers, followed by heating. Borazine oligomers may also be used to coat composites of various materials.

Figure 3:
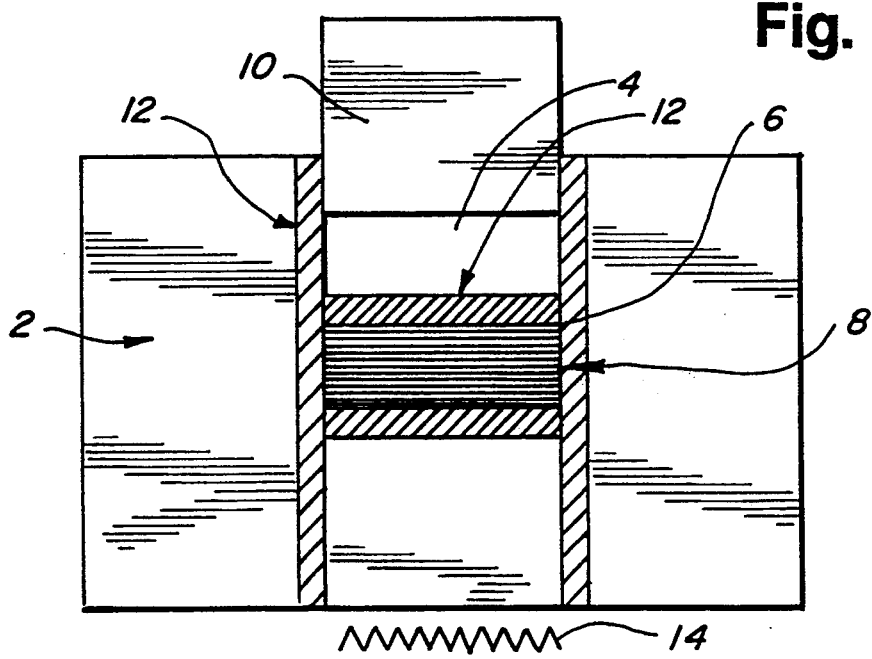
FIG. 3 is a schematic diagram of a mold for practicing and producing the products of the invention.

FIG. 3 is a schematic diagram of a mold useful for applying heat and pressure to the materials. The mold has a body 2 of stainless steel or low carbon steel surrounding pressure chamber 4. Working material 6 is shown as a plurality of layers of fibers bathed in borazine oligomer 8. Pressure plate 10 applies pressure to the working material. Graphite layers 12 surround the working material to prevent reaction with the mold body and facilitate removal of the working material after processing. Heat is supplied by heating element 14.

The following specific examples illustrate more clearly the manner in which the process of the present invention has been carried out, although the invention is not to be construed as being limited to the particular steps and products set forth in the examples.

Examples 1 through 7

Preparation of Carbon Fiber Boron Nitride Matrix Composites

1. Two kinds of carbon fibers, Amoco carbon fiber Thornel P-25 (pitch) and Thornel T-300 (PAN-polyacryl-onitrile), were cut to fit into the mold, were treated at 1000° C. in nitrogen for 10 minutes to remove the sizing from the surface of fibers and then placed in the mold.

2. A viscous oligomeric precursor was synthesized in the following general manner. In a typical reaction, 15 grams of borazine were heated in nitrogen atmosphere at 70° C. in a three ounce pressure reaction vessel. The reaction was continued with periodic degassing until the borazine oligomer became viscous with volume shrinkage.

With a reaction time of between 20 and 25 hours, the oligomer attained viscosities measured at 25° C. of 5 centipoise to 100 centipoise. With such viscosities there was risk of leakage from the mold referred to in step 3, the time for consolidation of the oligomer matrix with the fibers would be greatly increased and the product would be very sensitive to moisture. However, with reaction times of 35 to 45 hours, viscosities measured at 25° C. of 500 centipoise to 2500 centipoise were achieved which appears to be the optimum for production of composites. With longer reaction times, viscosities would be greatly increased leading to more difficulty in wetting the fibers as described in later steps and in infiltrating the fibers for densification as described in Examples 8 through 12.

3. The samples were prepared by placing 1.0 to 2.0 grams of unidirectional aligned fibers in a stainless steel or low carbon steel mold (25 mm×45 mm) fitted with graphite shims and graphite foils as releasing agents.

4. The oligomeric precursor was gently impregnated into the fiber bundle under an inert atmosphere using a surrounding glove box for hand manipulation. It was observed that the polymer easily wet fibers. The starting mixtures were generally controlled to consist of 60% fibers and 40% matrix by weight after the later pyrolysis, but, in some cases, low fiber composites with 20% of fiber were produced.

5. The oligomeric matrix was partially stabilized in shape through further polymerization in temperature ranges of 50° C. to 90° C. for two days under a nitrogen atmosphere in an oven. At this stage, gentle heating from low temperature was required to avoid some bloating and matrix expulsion by bubble percolation.

6. The samples were stabilized by step-wise thermal processing under non-oxidative crosslinking condition using heating rates of nominally 30° C. per hour up to a final temperature of 400° C. supplied by a Carver hot-press. Molding pressures were gradually applied up to 5 ksi. The total thermal processing time for crosslinking with pressures was 60 to 65 hours and the hot-press was then permitted to cool to room temperature.

7. The samples were carefully removed from the mold so as to prevent mechanical damage.

8. Pyrolysis was then performed in an electrical resistance furnace which was fitted with quartz or mullite tubes. The samples were placed in a ceramic boat and heated in a nitrogen or argon atmosphere up to 1200° C. and to 1500° C. at a rate of 60° C. per hour with no applied pressure. The temperature was held at its peak for annealing for 30 minutes to 3 hours. The furnace was then controlled to cool at 300° C. per hour.

9. The specimens were machined with a diamond saw to beams 5 mm×45 mm with thickness in the range of 1.3 mm to 1.7 mm. The density of composites were 1.38 to 1.43 grams/cc. The mechanical results are shown in Table 1 which for comparison also shows the parameter range for CFCM composites.

It should be noted that the interlayer spacing, that is, the distance between atomic layers as measured by x-ray deflection ranges between 3.34 Angstroms and 3.5 Angstroms, significantly below those in the Fazen reference and approaching the physical minimum of 3.33 Angstroms, thus contributing greatly to corrosion and oxidation resistance. Elemental analysis showed that the matrix contains 42% B and 54% N, and a small amount of hydrogen (<0.5%). The mechanical properties were determined in accordance with ASTM D-790 using an MTS testing machine. Oxidation resistance as shown by the upper line in FIG. 4 of the products was determined by thermogravimetric analysis (TGA) with a heating rate of 20° C./minute using dry air up to 1000° C.

TABLE 1

| Example | Heat Treatment Temperature | Heat Treatment Time | Carbon fiber (wt. %) | Flexural Strength Ksi | Flexural Modulus Msi | Interlayer Spacing of Matrix Angstroms |
| --- | --- | --- | --- | --- | --- | --- |
| 1 | 1200° C. | 30 min | PAN(60) | 94 | 12 | 3.5 |
| 2 | 1200° C. | 30 min | pitch(60) | 28 | 5 | 3.5 |
| 3 | 1200° C. | 30 min | pitch(20) | 10 | 1.5 | 3.5 |
| 4 | 1200° C. | 3 hours | PAN(60) | 88 | 11 | 3.37 |
| 5 | 1200° C. | 3 hours | pitch(60) | 73 | 9 | 3.36 |
| 6 | 1500° C. | 2 hours | PAN(60) | 58 | 6 | 3.35 |
| 7 | 1500° C. | 2 hours | pitch(60) | 101 | 14 | 3.34 |
|   |   |   | CFCM | 30–80 | 7–15 |   |

Examples 8 through 12

Densification of Carbon Fiber Boron Nitride Matrix Composites

1. The composite samples, prepared as in Examples 1 through 5 were placed in borazine oligomers with low viscosity (less than 1000 centipoise), prepared as described in Step 2 of Examples 1 through 7 for a period of 5 hours at room temperature during which time the oligomers infiltrated between the fibers and the existing BN matrix.

2. The infiltrated composites were transferred into an oven under an inert atmospheric condition and further polymerization was carried out at between 50° C. and 100° C. for 10 hours.

3. Non-oxidative crosslinking and pyrolysis were then continuously conducted in an electrical furnace fitted with a quartz or mullite tube, by heating to 1200° C. at a rate of 60° C./hour as in Step 8 of Examples 1 through 7, without applied pressure. The density was increased up to 1.61 g/cc. Repeated infiltrations did not appear to effectively increase the density of composites. The mechanical data of densified products are presented in Table 2.

TABLE 2

| Example | Heat Treatment Temperature | Heat Treatment Time | Carbon Fiber (wt. %) | Flexural Strength Ksi | Flexural Modulus Msi |
| --- | --- | --- | --- | --- | --- |
| 8 | 1200° C. | 30 min | PAN(60) | 123 | 12 |
| 9 | 1200° C. | 30 min | pitch(60) | 37 | 8 |
| 10 | 1200° C. | 30 min | pitch(20) | 21 | 2.5 |
| 11 | 1200° C. | 3 hours | PAN(60) | 112 | 14 |
| 12 | 1200° C. | 3 hours | pitch(60) | 75 | 8 |

Example 13

Preparation of CFCM Composites Coated with Boron Nitride

1. CFCM composites were prepared using the processes described in the previously cited article by Economy, Jung and Gogeva in Carbon, Vol. 30, No. 1, pp 81–85 (1991).

2. These composites were immersed in borazine oligomers which were prepared as in Step 2 of Examples 1 to 7, having viscosities of 1000 centipoise to 5000 centipoise, for a period of two hours at room temperature, to coat the composites.

3. The coated composites were further polymerized and stabilized, then subjected to pyrolysis as set forth in steps 2 and 3 of Examples 8 through 12 at a temperature of 1200° C. The middle line in FIG. 4 shows the oxidation resistance of the resulting coated products of this example determined using similar methods as described for Examples 1–7.

Figure 4:
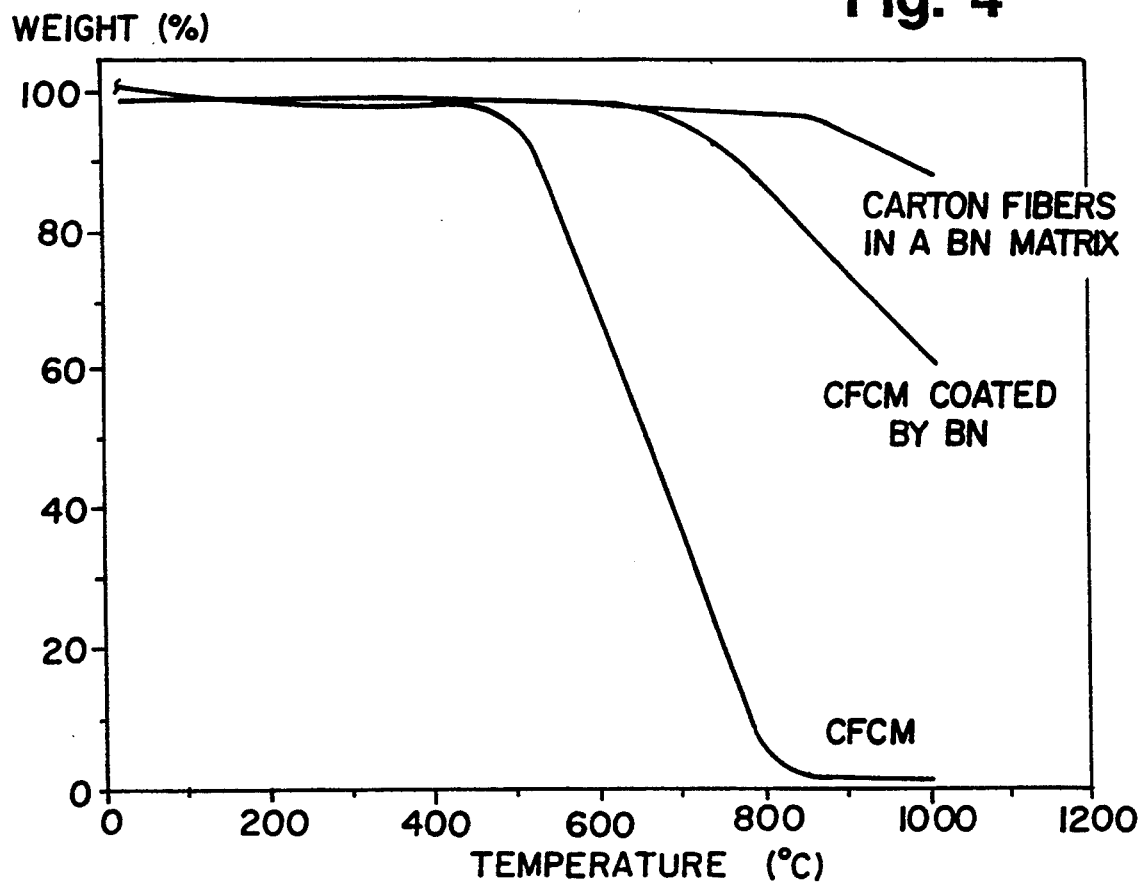
FIG. 4 is a graph showing oxidation resistance of various materials.

FIG. 4 is a graph showing the oxidation resistance measured by percent of original weight as a function of temperature for exemplary known CFCM composites, for carbon fibers in a boron nitride matrix as in Examples 1 through 7 and for CFCM composites further coated with boron nitride using borazine oligomers as in Example 13. The enhanced properties resulting from addition of boron nitride is evident. Such results were surprising because, to applicants' knowledge, composites of carbon fibers in a boron nitride matrix have not been successfully prepared and there has been considerable doubt that effective bonding between these materials could be formed.

Examples 14 through 17

Preparation of Boron Nitride Matrix Composites Using Ceramic Fibers

1. Four kinds of commercial ceramic fibers, Nextel 440(3M), Nicalon (Dow Corning), Altex (Sumitomo) and FP(DuPont) fibers, were used after the coated sizing on the fibers was removed by heating at 450° C. for 30 minutes in air. The published compositions of these fibers are shown in Table 3.

2. 1.5 to 2.5 grams of unidirectional aligned fibers, depending on their density, and the viscous oligomeric matrix were impregnated in the same manner as Examples 1 through 7. The starting combinations were controlled to consist of 40% volume of fibers, respectively, after pyrolysis.

3. The samples were treated for prepreg by further polymerization in oven, crosslinkng and pyrolysis by the same thermal processing as in Examples 1 through 7, except the non-oxidative cross-linking process was followed by the machining of the specimens because the samples became very hard materials after pyrolysis. The samples were heated for 3 hours at a heat treatment temperature of 1000° C. to 1200° C. The mechanical results and density are shown in Table 3 .

TABLE 3

| Example | Fiber and Composition | Temp. °C. | Flexural Strength MPa(Ksi) | Flexural Modulus GPa(Msi) | Strain % | Density g/Cm$^3$ |
|---|---|---|---|---|---|---|
| 14 | NEXTEL 70% $Al_2O_3$ 28% $SiO_2$ 2% $B_2O_3$ | 1200 | 190(27) | 65(9.5) | 0.35 | 2.07 |
| 15 | NICALON 54% Si 12% O 30% C | 1000 1200 | 350(50) 420(60) | 60(9) 80(12) | 0.4–0.75 0.4–0.75 | 1.87 |
| 16 | ALTEX 85% $Al_2O_3$ 15% $SiO_2$ | 1200 | 370(54) | 80(12) | 0.5 | 2.40 |
|  | FP 99% $Al_2O_3$ | 1200 | 70(10) | 30(4.5) | 0.25 | 2.5–2.8 |

Examples 18 and 19

Densification of Porous CFCM Composite by Impregnated Boron Nitride

1. T-300 carbon fabric impregnated with SC-1008 phenolic resin was supplied by Fiberite Co. Two dimensional composites with a fiber volume of 60% were made with laminates of 16 plies. These composites were cured at 80° C. for two hours and then hot pressed at 150 psi and 165° C. for one hour and then cooled at 2° C. per minute. The samples were then postcured at 200° C. overnight.

2. The composites were cut to appropriate size and then carbonized in a tube furnace in a nitrogen atmosphere. The samples were heated at 1° C. per minute to 1200° C. (Example 18) and 800° C. (Example 19), respectively, and maintained at such temperatures for one hour before being cooled to room temperature. The resulting composites contained 20% to 30% porosity.

Densification was achieved by the following steps:

3. Composite samples were placed in a glass container connected to a vacuum pump to evacuate air in the pores at 100° C. for three hours and then cooled to room temperature after the container was sealed from the pump.

4. Borazine oligomer, prepared as in Step 2 of Examples 1–7 was forced into the container to infiltrate the pores in the samples. The system was gently heated to 50° C.–100° C. for 10 hours to solidify the oligomer in the pores.

5. The impregnated samples were transferred to a mullite tube in an electrical furnace and heated at 60° C. per hour to 1200° C. and maintained at that temperature for one hour.

6. Steps 3, 4 and 5 were repeated for a second impregnation cycle.

The densities of the materials were determined using a pycnometer after Steps 1, 2, 5 and 6 and are shown in Table 4. The last line of Table 4 shows the lower densities of similar samples densified with coal-tar, found in the literature.

TABLE 4

| Example | Carbonization Temperature °C. | Density (g.lcc.) | | | |
|---|---|---|---|---|---|
| | | Polymer Composite | Carbonized Composite | Impregnation Cycle 1 | 2 |
| 18 | 1200 | 1.35–1.40 | 1.1–1.2 | 1.33–1.37 | 1.42–1.48 |
| 19 | 800 | 1.35–1.40 | 1.1–1.2 | 1.23–1.28 | 1.40–1.45 |
| | Densified with Coal-Tar | | | 1.22–1.30 | 1.28–1.33 |

The viscosity of the borazine oligomer may be adjusted by using a solution thereof, for example, in tetrahydrofuran. This may be particularly useful in impregnating, infiltrating or coating CFCM composites using steps similar to the steps set forth in examples 1 through 12 even when the CFCM composites are not completely developed according to the known multi-step processes. Of course, provision must be made for removing the solvent.

It may be seen from the foregoing that the composites produced by this method may be made in a much shorter period of time than was previously possible. It appears that one factor in this result is the very high yield of boron nitride from the borazine oligomer. This leads to less repetition and shorter processing times. However, applicants' invention is not concerned with or confined to the truth of any particular theory.

The combination of a boron nitride matrix with carbon fibers, as contrasted with CFCM composites, extends the use temperature in air from 425° C. to at least 850° C. For higher temperature a coating of a refractory material such as SiC or $Si_3N_4$ may provide protection against failure due to microcracks because the boron will oxidize to $B_2O_3$ which will react with Si to form a stable glass. Boron nitride has a low dielectric constant so that such composites including low dielectric constant oxide fiber, may be less detectable and be useful in low observables technology.

Very good bonding between carbon fibers and the boron nitride matrix is achieved, despite the high processing temperatures and the differences in coefficients of thermal expansion between the materials. It is believed that this contributes to resilience and oxidation resistance of the composites. The latter property may be enhanced by incorporation of $SiO_2$ or other oxide precursors.

For some applications, various properties may be improved by using additional processes known in the prior art such as chemical vapor infiltration of boron nitride. In addition, it may be possible to simultaneously pyrolize carbon precursor oligomers. It is desirable that the fibers, particularly fibers which produce volatiles on heating at high temperatures, such as carbon fibers, be pre-heated to the temperature of treatment with the oligomers or even the temperature of ultimate use of the product.

It should be apparent to one skilled in the art that a wide range of composites could be formed by this process including continuous filament wound structures, three-dimensional woven structures, etc. Refractory coatings of the fiber may also provide important advantages such as better control of mechanical properties at the interface or to protect some of the oxide fibers from attack by the BN intermediates during processing at elevated temperatures.

Various changes and modifications could be made in the invention without departing from its scope.

What is claimed is:

1. A method of making a composite material comprising:
   a. heating a quantity of borazine in a nitrogen atmosphere to a temperature of approximately 70° C.,
   b. be maintaining said temperature until said quantity attains a viscosity of between 100 centipoise and 10,000 centipoise, having become borazine oligomer,
   c. immersing a plurality of fibers in said borazine oligomer, and
   d. applying heat and pressure to said fibers and said borazine oligomer to form a solid composite material of said fibers in a boron nitride matrix.

2. A method in accordance with claim 1 wherein said borazine oligomer bonds to said fibers.

3. A method in accordance with claim 1 wherein said borazine oligomer impregnates spaces between said fibers.

4. A method in accordance with claim 1 wherein said borazine oligomer coats the outer surface of said composite material.

5. A method of making a composite material including boron nitride comprising:
   a. heating a quantity of borazine in a nitrogen atmosphere to a temperature of approximately 70° C.,
   b. be maintaining said temperature until said quantity attains a viscosity of between 100 centipoise and 10,000 centipoise, having become borazine oligomer,
   c. immersing a carbon fiber carbon matrix composite material in said borazine oligomer, and
   d. applying heat to said composite material and said borazine oligomer to form a composite material including a boron nitride matrix.

6. A method in accordance with claim 5 wherein said borazine oligomer bonds to said carbon fiber carbon matrix composite material.

7. A method in accordance with claim 5 wherein said borazine oligomer impregnates spaces within said carbon fiber carbon matrix composite material.

8. A method in accordance with claim 5 wherein said borazine oligomer coats the outer surface of said carbon fiber carbon matrix composite material.

* * * * *